United States Patent [19]
Ellis

[11] Patent Number: 5,913,639
[45] Date of Patent: Jun. 22, 1999

[54] MECHANIZED CABLE PULLER

[76] Inventor: George E. Ellis, P.O. Box 1675, Denham Springs, La. 70727-1675

[21] Appl. No.: 09/003,698

[22] Filed: Jan. 5, 1998

[51] Int. Cl.[6] ........................................................ E02F 5/10
[52] U.S. Cl. ............................ 405/184; 405/154; 242/557; 37/403
[58] Field of Search .................... 405/154, 155, 405/157, 171, 175, 176, 177, 184; 37/403; 172/245, 247, 253, 254; 414/912; 242/557

[56] References Cited

U.S. PATENT DOCUMENTS

| | | | |
|---|---|---|---|
| 2,679,987 | 6/1954 | Saliba | 242/66 |
| 3,100,606 | 8/1963 | Nicholson | 242/86.5 |
| 4,437,622 | 3/1984 | Heider | 242/86.5 R |
| 4,767,073 | 8/1988 | Malzacher | 242/54 R |
| 4,890,957 | 1/1990 | Rinas | 405/174 |
| 5,156,355 | 10/1992 | Wadle | 242/557 |
| 5,211,509 | 5/1993 | Roessler | 405/154 |
| 5,215,272 | 6/1993 | Sauber | 242/54 R |
| 5,332,166 | 7/1994 | Kepes | 242/390.2 |
| 5,653,293 | 8/1997 | Ellis | 172/438 |
| 5,672,029 | 9/1997 | Boyer | 405/154 |

*Primary Examiner*—Tamara Graysay
*Assistant Examiner*—Frederick Lagman
*Attorney, Agent, or Firm*—Reginald F. Roberts, Jr.

[57] ABSTRACT

A mechanized cable puller. By combinig a hydraulic track-mounted excavator with a winding spool the present invention provides underground machinery for pulling underground electrical cable from an underground conduit into an underground cable vault, without requiring the temporary installation of direction-changing pulleys in the cable vault. By using a square bar as part of the underground machinery, the cable can be pulled from any of four different directions, spaced ninety degrees apart, in a three-hundred-and-sixty-degree span.

6 Claims, 2 Drawing Sheets

MECHANIZED CABLE PULLER

BACKGROUND OF THE INVENTION

The present invention relates to electrical conduit. More particularly, the invention relates to pulling electrical cable through undeground electrical conduit.

This objective is usually accomplished by mounting cable-pulling machinery on an automotive vehicle such as a tractor or backhoe. The automotive vehicle and cable-pulling machinery are disposed above ground, and the cable vault and conduit are below ground. This arrangement suffers from the disdavantage that the cable-pulling machinery is not on the same level as the electrical conduit and electrical cable, and therefore requires temporary installation of direction-changing pulleys in the vault. This disadvantage is eliminated and overcome by the present invention.

SUMMARY OF THE INVENTION

In general, the present invention in a first aspect comprises the combination of a hydraulic track-mounted excavator and motorized means for pulling cable from a conduit into an underground cable vault. The excavator includes a tractor, a boom, and a digging bucket pivotally connected to the boom. A hydraulic motor is mounted on the digging bucket. A spool is rotatably connected to the hydraulic motor. By means of this arrangement the digging bucket, spool, and hydraulic motor can be disposed below ground in the cable vault; a length of rope can be wound around and connected to the spool, leaving one end of the rope free and extending away from the spool; the free end of the rope can be attached to an underground cable disposed in a conduit; and the spool can be rotated by the hydraulic motor in a direction causing the cable to be pulled toward the spool.

In a second aspect the invention comprises in combination a motorized vehicle and means for pulling cable from a conduit into an underground cable vault. The motorized vehicle includes a mobile carriage, a digging bucket movably connected to the carriage, and means for lowering the digging bucket into the cable vault. A hydraulic motor is mounted on the digging bucket. A spool is rotatably connected to the hydraulic motor. By means of this arrangement the digging bucket, spool, and hydraulic motor can be disposed below ground in the cable vault; a length of rope can be wound around and connected to the spool, leaving one end of the rope free and extending away from the spool; the free end of the rope can be attached to an underground cable disposed in a conduit; and the spool can be rotated by the hydraulic motor in a direction causing the cable to be pulled toward the spool.

DETAILED DESCRIPTION OF THE INVENTION

In this application the term "cable" is used to designate either electrical cable or electrical wire, and the term "polygonal" to designate any geometrical figure having a plurality of sides and angles; e.g., a triangle, a rectangle, or an octagon.

Figure 1:
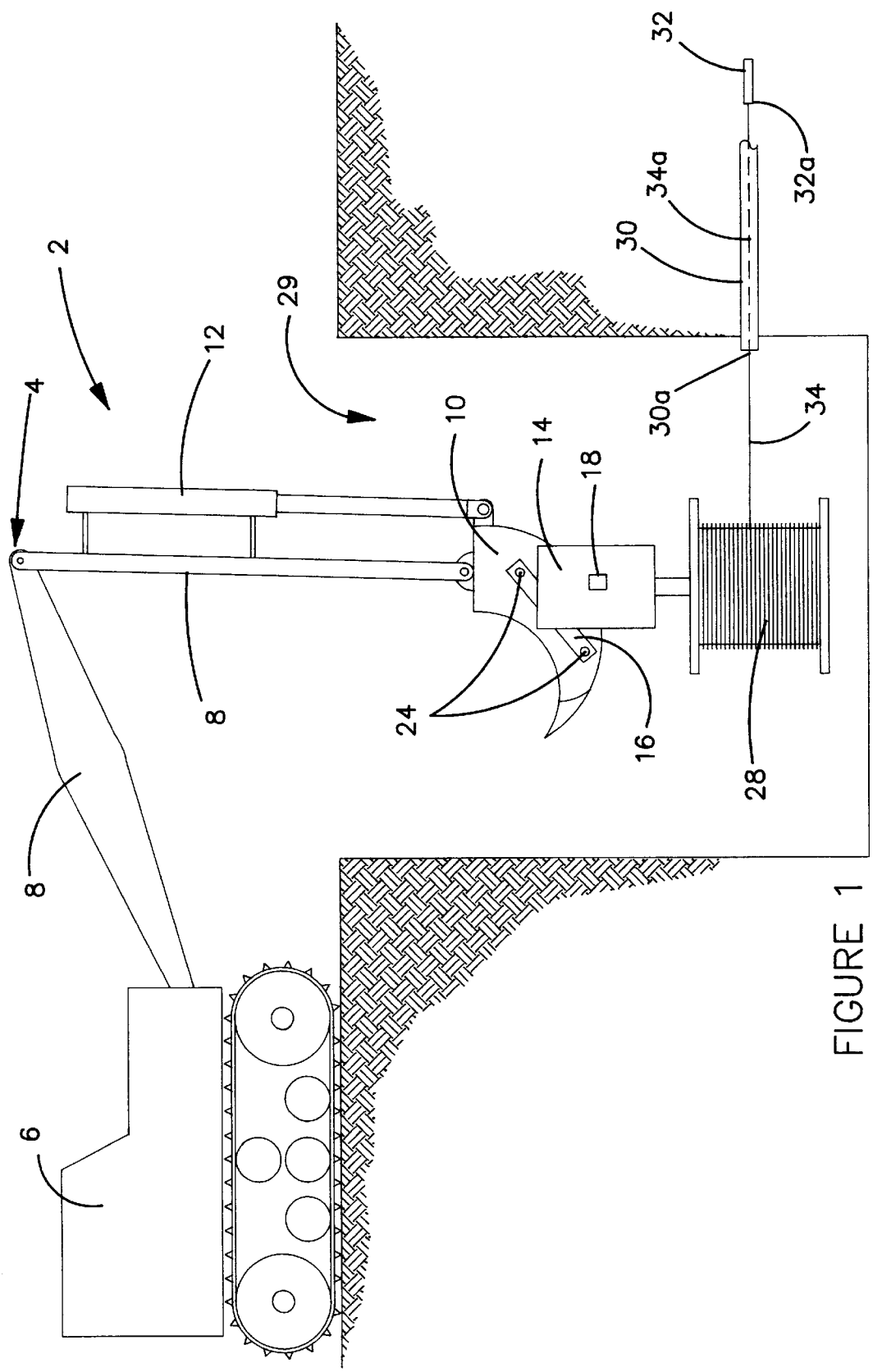
FIG. 1 is a side elevation of a mechanized cable puller, made in accordance with the principles of the present invention, illustrating the operation of the mechanized cable puller to pull underground cable from an underground conduit into an underground cable vault.
Figure 4:
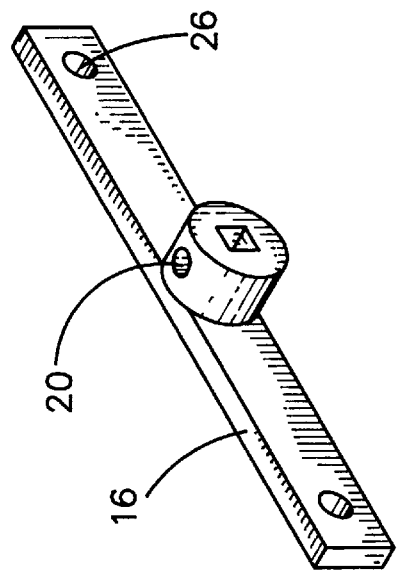
FIG. 4 is an enlarged side view of a portion of the mechanized cable puller shown in FIG. 1.
Figure 3:
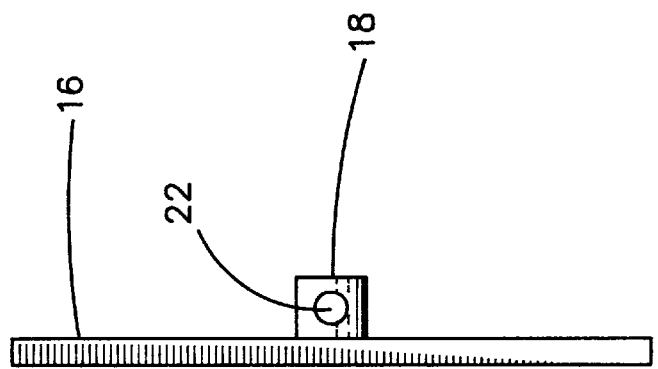
FIG. 3 is an enlarged side view of a portion of the mechanized cable puller shown in FIG. 1.
Figure 2:
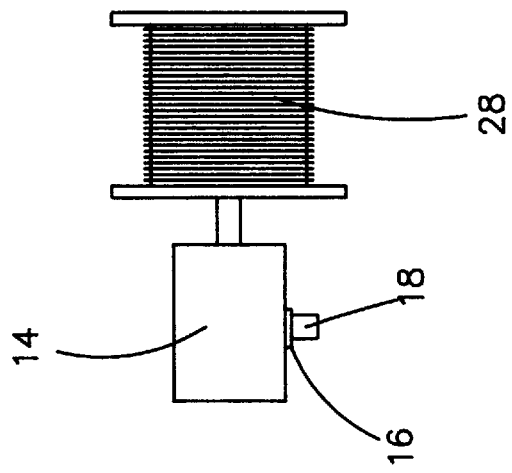
FIG. 2 is an enlarged side view of a portion of the mechanized cable puller shown in FIG. 1.

More specifically, reference is made to FIG. 1, in which is shown a mechanized cable puller, made in accordance with the principles of the present invention and generally designated by the numeral 2; and to FIGS. 2–4, in which portions of the mechanized cable puller are illustrated in greater detail.

The mechanized cable puller 2 comprises a hydraulic track-mounted excavator 4 which includes a tractor 6, a boom 8, and a digging bucket 10 pivotally connected to the boom 8. A hydraulic cylinder 12 provides hydraulic fluid to operate the digging bucket 10.

A hydraulic motor 14 is fastened to a mounting plate 16 by a polygonal bar 18 disposed in a polygonal opening 20 and held therein by a mounting pin 22, whereby the hydraulic motor 14 and the spool 28 can be disposed in a plurality of different orientations, in a three-hundred-and-sixty-degree span. The polygonal bar 18 and opening 20 are preferably square, as shown in FIGS. 1–4. The mounting plate 16 is fastened to the digging bucket 10 by mounting bolts 24 disposed in openings 26. Hydraulic fluid is supplied to the motor 14 by auxiliary lines (not shown).

A spool 28 is rotatably connected to and rotated by the hydraulic motor 14. The spool 28 is disposed in a cable vault 29 near the mouth 30a of an electrical conduit 30 in which an underground electrical cable 32 is disposed. A length of rope 34 is wound around and connected to the spool 28, leaving one end 34a of the rope 34 free and extending away from the spool 28. The free end 34a of the rope 34 is attached to the free end 32a of the cable 32, and the cable 32 is pulled from the conduit 30 toward the spool 28 by rotating the spool 28 in a direction which winds the rope 34 onto the spool 28.

It will be apparent from the foregoing description that the present invention solves the problem alluded to in the background section of this application by providing underground means for pulling the cable 32 from the conduit 30. Moreover, the square bar 18 enables the hydraulic motor 14 and the spool 28 to be disposed in four different orientations, ninety degrees apart, in a three-hundred-and-sixty-degree span, so that the cable 32 can be pulled from any of four different directions.

I claim:

1. A mechanized cable puller for pulling cable from a conduit into an underground cable vault, the mechanized cable puller comprising:

(a) a hydraulic track-mounted excavator which includes a tractor, a boom, and a digging bucket pivotally connected to the boom;

(b) a hydraulic motor mounted on the digging bucket; and (c) a spool rotatably connected to the hydraulic motor;

whereby the digging bucket, spool, and hydraulic motor can be disposed below ground in a cable vault; a length of rope can be wound around and connected to the spool, leaving one end of the rope free and extending away from the spool; the free end of the rope can be attached to an underground cable disposed in a conduit; and the spool can be rotated by the hydraulic motor in a direction causing the cable to be pulled toward the spool.

2. The mechanized cable puller of claim 1, further comprising:

(d) a mounting plate for mounting the hydraulic motor on the digging bucket, the mounting plate including a polygonal opening therein and being fastened to the digging bucket; and (e) a polygonal bar rigidly disposed in the polygonal opening in the mounting plate, the polygonal bar fastening the hydraulic motor to the mounting plate in one of a plurality of different orientations;

whereby the hydraulic motor and the spool can be disposed in a plurality of different orientations, in a three-hundred-and-sixty-degree span.

3. The mechanized cable puller of claim 2, wherein the opening and the bar are square, whereby the hydraulic motor and the spool can be disposed in four different orientations, ninety degrees apart, in a three-hundred-and sixty-degree span.

4. A mechanized cable puller for pulling cable from a conduit into an underground cable vault, the mechanized cable puller comprising:

(a) a motoriized vehicle which includes a mobile carriage, a digging bucket movably connected to the carriage, and means for lowering the digging bucket into the cable vault;

(b) a hydraulic motor mounted on the digging bucket; and (c) a spool rotatably connected to the hydraulic motor;

whereby the digging bucket, spool, and hydraulic motor can be disposed below ground in a cable vault; a length of rope can be wound around and connected to the spool; the free end of the rope can be attached to an underground cable disposed in a conduit; and the spool can be rotated by the hydraulic motor in a direction causing the cable to be pulled toward the spool.

5. The mechanized cable puller of claim 4, further comprising:

(d) a mounting plate for mounting the hydraulic motor on the digging bucket, the mounting plate including a polygonal opening therein and being fastened to the digging bucket; and (e) a polygonal bar rigidly disposed in the polygonal opening in the mounting plate, the polygonal bar fastening the hydraulic motor to the mounting plate in one of a plurality of possible orientations;

whereby the hydraulic motor and the spool can be disposed in a plurality of different orientations, in a three-hundred-and-sixty-degree span.

6. The mechanized cable puller of claim 5, wherein the opening and the bar are square, whereby the hydraulic motor and the spool can be disposed in four different orientations, ninety degrees apart, in a three-hundred-and-sixty-degree span.

* * * * *